(12) United States Patent
Gaur et al.

(10) Patent No.: US 11,645,550 B2
(45) Date of Patent: May 9, 2023

(54) GENERATION OF DIGITAL STANDARDS USING MACHINE-LEARNING MODEL

(71) Applicants: SAE International, Warrendale, PA (US); COGNISTIC LLC, Pittsburgh, PA (US)

(72) Inventors: Divyesh Gaur, Pittsburgh, PA (US); Uxue Zurutuza Dorronsoro, Pittsburgh, PA (US); Anna Belova, Pittsburgh, PA (US); Audra Ziegenfuss, Baden, PA (US); Roshan Bhave, Pittsburgh, PA (US)

(73) Assignee: SAE International, Warrendale, PA (US)

( * ) Notice: Subject to any disclaimer, the term of this patent is extended or adjusted under 35 U.S.C. 154(b) by 365 days.

(21) Appl. No.: 16/905,559

(22) Filed: Jun. 18, 2020

(65) Prior Publication Data
US 2021/0397979 A1    Dec. 23, 2021

(51) Int. Cl.
*G06N 20/00* (2019.01)
*G06K 9/62* (2022.01)
*G06N 5/025* (2023.01)

(52) U.S. Cl.
CPC .......... *G06N 5/025* (2013.01); *G06K 9/6218* (2013.01); *G06K 9/6256* (2013.01); *G06N 20/00* (2019.01)

(58) Field of Classification Search
CPC ....... G06K 9/6256; G06N 20/00; G06F 16/31
See application file for complete search history.

(56) References Cited

U.S. PATENT DOCUMENTS

| | | | |
|---|---|---|---|
| 11,328,025 B1 * | 5/2022 | Cobb | G06F 16/906 |
| 11,393,024 B1 * | 7/2022 | Kodihalli | G06N 20/00 |
| 2017/0169103 A1 * | 6/2017 | Juneja | G06F 16/3346 |
| 2018/0137107 A1 * | 5/2018 | Buccapatnam Tirumala | G06N 20/00 |
| 2020/0050949 A1 * | 2/2020 | Sundararaman | G06F 40/284 |
| 2020/0142856 A1 * | 5/2020 | Neelamana | G06K 9/6253 |
| 2020/0151392 A1 | 5/2020 | Crabtree et al. | |
| 2020/0251091 A1 * | 8/2020 | Zhao | G10L 15/26 |
| 2022/0180066 A1 * | 6/2022 | Wu | G06F 40/284 |

OTHER PUBLICATIONS

Hackelbusch, Richard, International Search Report for PCT/US2021/037858, dated Oct. 1, 2021, 3 pages.

* cited by examiner

*Primary Examiner* — Dangelino N Gortayo
(74) *Attorney, Agent, or Firm* — Ference & Associates LLC; Gregory L. Bradley, Esq.

(57) ABSTRACT

One embodiment provides a method for generating a digital standard utilizing a trained machine-learning model, the method including: receiving an underlying standard; extracting conceptual units from the underlying standard; classifying, using at least one trained machine-learning model, at least a portion of the extracted conceptual units into one of a plurality of classification groups, wherein each of the classification groups identifies a function of the extracted conceptual units, included within a given classification group, within the underlying standard; wherein the classifying comprises classifying conceptual units from the underlying standard based upon sections of a schema corresponding to a digital standard; and storing the classified extracted conceptual units into a data repository based upon the schema. Other aspects are described and claimed.

20 Claims, 6 Drawing Sheets

FIG. 4

GENERATION OF DIGITAL STANDARDS USING MACHINE-LEARNING MODEL

BACKGROUND

Standards are very important to many different industries. The use of standards ensures consistency across an industry regardless of the entity that is manufacturing, producing, maintaining, implementing, or otherwise interacting with the object or service that corresponds to the standard. For example, the transportation industry has standards that are related to materials and parts that are included within an automobile, airplane, helicopter, train, or other transportation vehicles. These standards may identify the properties (e.g., size, material, tensile strength, sheer force, tolerances, etc.) of each object within or making up the transportation vehicle (e.g., bolts, sheet metal, nuts, rivets, pistons, safety features, etc.). The standards are created by a governing body of the industry that then passes the standards onto the manufacturers, suppliers, assemblers, repairers, and other entities within the industry. Adherence to these standards is critical to ensuring consistency and safety across the industry. Alternatively, the standards may be internal standards that are developed by a company and are then expected to be adhered to throughout the company.

BRIEF SUMMARY

In summary, one aspect provides a method for generating a digital standard utilizing a trained machine-learning model, the method comprising: receiving an underlying standard; extracting conceptual units from the underlying standard; classifying, using at least one trained machine-learning model, at least a portion of the extracted conceptual units into one of a plurality of classification groups, wherein each of the classification groups identifies a function of the extracted conceptual units, included within a given classification group, within the underlying standard; wherein the classifying comprises classifying conceptual units from the underlying standard based upon sections of a schema corresponding to a digital standard; and storing the classified extracted conceptual units into a data repository based upon the schema.

Another aspect provides a system for generating a digital standard utilizing a trained machine-learning model, the system comprising: one or more processors; a memory device that stores instructions executable by the processor to: receive an underlying standard; extract conceptual units from the underlying standard; classify, using at least one trained machine-learning model, at least a portion of the extracted conceptual units into one of a plurality of classification groups, wherein each of the classification groups identifies a function of the extracted conceptual units, included within a given classification group, within the underlying standard; wherein the classifying comprises classifying conceptual units from the underlying standard based upon sections of a schema corresponding to a digital standard; and store the classified extracted conceptual units into a data repository based upon the schema.

A further aspect provides a product for generating a digital standard utilizing a trained machine-learning model, the product comprising: a storage device that stores code, the code being executable by one or more processors and comprising: code that receives an underlying standard; code that extracts conceptual units from the underlying standard; code that classifies, using at least one trained machine-learning model, at least a portion of the extracted conceptual units into one of a plurality of classification groups, wherein each of the classification groups identifies a function of the extracted conceptual units, included within a given classification group, within the underlying standard; wherein the classifying comprises classifying conceptual units from the underlying standard based upon sections of a schema corresponding to a digital standard; and code that stores the classified extracted conceptual units into a data repository based upon the schema.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 4 illustrates an example aggregated table within a properties tab corresponding to a digital standard of a materials category.

DETAILED DESCRIPTION

Figure 1:
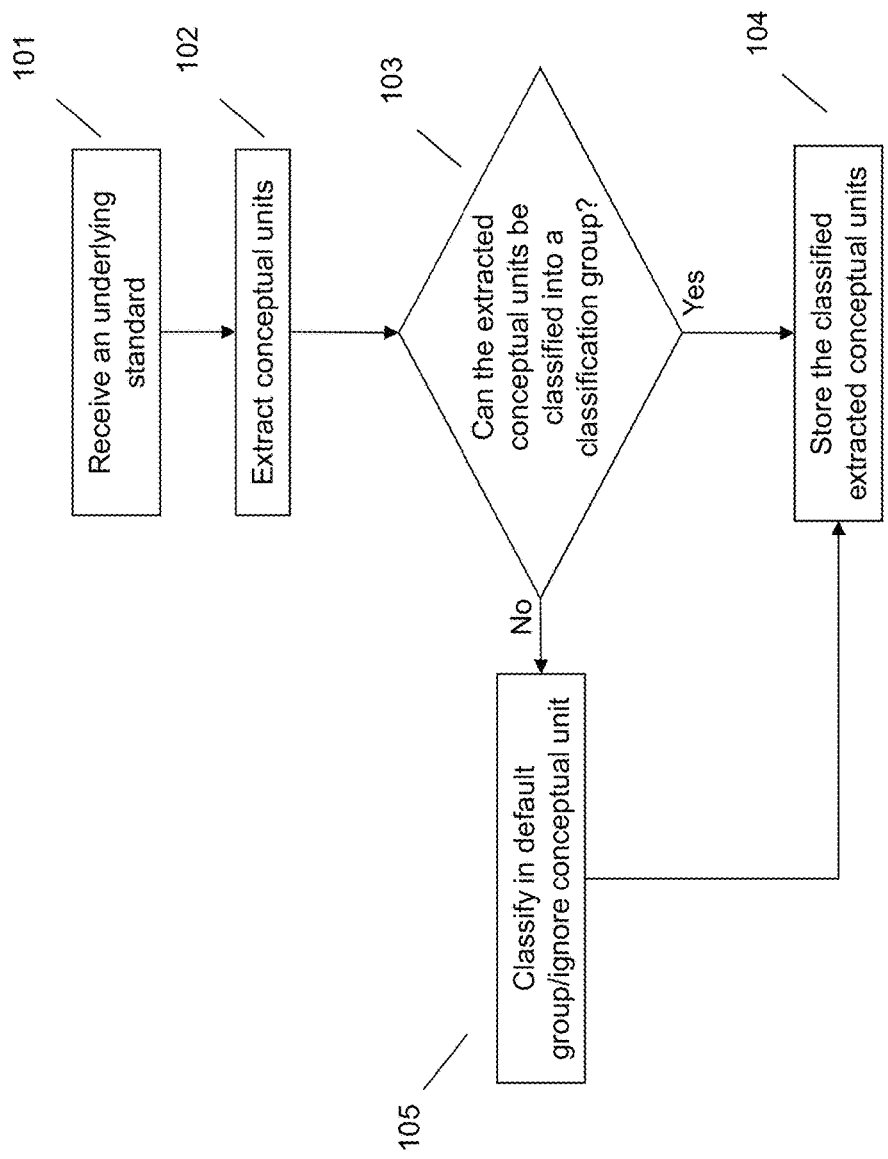
FIG. 1 illustrates an example method for generating a digital standard from an underlying standard using a machine-learning model.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Standards for industries (e.g., transportation, energy, manufacturing, engineering, etc.) are very complex and extensive. Governing bodies, including internal company governing bodies, which create the standards typically spend significant amounts of time, for example, years, presenting, revising, and adopting a single standard. Since the standards document includes multiple requirements and data specific to a part, material, process, management approach, or the like, for global industry or companywide adoption, the length of time to create the standards document is quite significant. Once the standards document is created, it is available to any applicable entity to make sure that the consistency and adherence to the standards is maintained throughout an industry, company, or other entity. Typically, the standards document is a paper document or pdf. When revisions to a standard are introduced, the standard is updated with a revised document which supersedes the earlier version. These revisions then have to be available to any applicable entity.

With the increase in technology, distribution of the standards documents and revisions has become easier since they can be provided on a technological platform (e.g., server, Internet website, data storage location, etc.) that can then be accessed by anyone who wants or needs access to the standards document. However, as with the paper or pdf versions of the standards, this technique of merely uploading or saving the standards and revisions to a data repository has some drawbacks, particularly for those users within the industry that need to access and implement the standards.

One problem with this technique is that while the standards are now in an electronic form (i.e., pdf), that electronic format is effectively similar to the paper copies in that they cannot be searched and finding information related to a particular part, requirement, specification, material, regulation, standard or the like, is time intensive. While some conventional techniques allow for conversion of the electronic version of the standard to a searchable format, for example, through optical character recognition, this conversion only slightly reduces the amount of time it takes to find target information. In this case, the user must select a search term that will result in the desired information. Additionally, since the format of the standards from paper to electronic form remain largely unchanged, even if converted to a searchable format, it is still difficult to find target information.

One approach to solving this problem has been to convert the paper standards to a digital standard using rules to classify different aspects of the standard, for example, requirements and sections. However, this is not an accurate conversion since many of the terms that designate different aspects of the standard are not uniform, thereby leading to portions missing from a designated aspect. Additionally, rules are created by human users that review information to create the rule. Since information may be presented in a standard in multiple ways or formats, one problem with manually programming a rule is that information may be missed based upon the way a rule is programmed. In other words, the rules may not accurately classify or capture information so that it is presented in the proper location.

Additionally, there is not a specified format or display for presenting information in a standard in a digital format, so each entity that creates rules for the conversion to a digital standard may do so in a different manner. Thus, the resulting digital standards are different from each creating entity, making it difficult for the entities accessing the digital standards to identify where target information should be located because it may be in different locations depending on the digital-standard-creating entity. Finally, because this technique of manually programming rules is fairly simple and rudimentary, it, at best, allows for a keyword search much like the conversion of the paper standard to the electronic format utilizing text recognition techniques.

Accordingly, an embodiment provides a method for generating digital standards using a machine-learning model. The term "digital standard" as used herein is more than a simple conversion of the paper standards to a digital format, for example, by saving it in a digital format or even converting it to a searchable format, for example, by using text recognition techniques. Rather, the term "digital standard" refers to not only the conversion of the paper standard to an electronic format, but more specifically, the data structure and data model describing the interaction and relationships among different aspects within a given standard, between a given standard and other standards, and between a given standard and other documents, applications, and/or data sources. Furthermore, when an application is built which accesses data from the data stores just described, the digital format adds functionality to the standard that allows for users within an industry to view information for a particular part, material, standard, requirement, regulation, or the like, in a display where the user can interact with the information to identify sources of the information, view sections, data, and requirements of a standard, find related information, and the like. In other words, "digital standards" refers to not only the digitization of the paper standard, but also the digital layout, data model and schema, and digital functionality included with the digitization of the standard.

To generate the digital standards, the machine-learning model is first trained utilizing different standards. It should be understood by one skilled in the art that the machine-learning model may actually be a group of machine-learning models, a distributed system of machine-learning models, or the like. The machine-learning model may be stored or located on a local network, remote server, cloud computing environment, or the like. It may also be stored or located on a combination thereof. Training the machine-learning model may take a variety of forms and may be dependent on the information or output expected from the machine-learning model.

For example, if the information within the underlying standard that is to be converted to a digital standard is mostly text or unstructured information (referred to collectively as "unstructured information" for ease of readability) as opposed to images or structured information (e.g., tables, graphics, charts, etc.) (referred to collectively as "structured information" for ease of readability), the machine-learning model may be trained utilizing annotated underlying standards. A human or group of humans may manually annotate underlying standards and then provide these to the machine-learning model as one or more training datasets. The machine-learning model digests the training datasets and is then able to make predictions with respect to newly presented underlying standards that are not annotated. As the machine-learning model makes predictions, feedback can be provided to the machine-learning model. The feedback allows the machine-learning model to become more refined and more accurate over time.

As another example, if the information within the underlying standard that is to be converted to a digital standard is mostly structured information, the machine-learning model may be trained utilizing pattern-based artificial intelligence, which does not require manual annotation of underlying standards to train the machine-learning model. Rather, the machine-learning model is taught to recognize patterns that delineate information as belonging to particular section of the digital standard schema. Since underlying standards may include both structured and unstructured information, more than one machine-learning model may be used, with each machine-learning model being trained to recognize particular information. Additionally, it should be understood by one skilled in the art that the system may utilize more than one machine-learning model for each type of information, for example, the system may employ more than one machine-learning model for unstructured information. Alternatively, a single machine-learning model may be used that is trained on all types of information and is able to recognize both structured and unstructured information. It should also be understood by one skilled in the art that a single machine-learning model may be distributed across multiple hardware and/or software components, for example, in a cloud-computing environment, distributed model environment, or the like.

The trained machine-learning model (referred to in the singular for ease of readability, but not intended to limit this disclosure to a single model), may then be used to convert underlying standards into digital standards utilizing a schema corresponding to the digital standard as discussed further herein. Thus, such a system provides a technical improvement to the current electronic format of paper standards by providing additional functionality and data structure with respect to the standard that is not provided by or within current solutions. For example, utilizing the machine-learning model to generate the digital standards provides for consistent digital standards across parts, procedures, regulations, materials, or other objects, within and across different industries, entities, and the like. Additionally, the machine-learning model can more accurately classify and/or convert information as compared to the manual techniques and rule generation. Thus, the resulting digital standards are more consistent, more accurate, more quickly generated, and provide more functionality as compared to traditional techniques, for example, rule generation.

Once the machine-learning model generates the digital standard, the digital standard can be provided in a user interface where a user can not only provide search criteria related to content within the data stores or related data stores and receive the information related to the provided search criteria, but the user can also find similar parts, regulations, materials, or the like, receive alerts related to changes in the information, interact with the information to identify sources of the information, identify statuses of the underlying information sources, filter returned search results, and easily locate necessary information, for example, requirements, and context related to that information, all in an intuitive display and user interface. More details regarding one example user interface that can be utilized for accessing the digital standards that are generated can be found in U.S. patent application Ser. No. 16/828,254, filed on Mar. 24, 2020, the contents of which are incorporated by reference herein as if set forth in its entirety.

The illustrated example embodiments will be best understood by reference to the figures. The following description is intended only by way of example, and simply illustrates certain example embodiments.

The described system provides a technique for utilizing a trained machine-learning model to generate digital standards. The system takes an underlying standard and not only converts the underlying standard to a digital or electronic format, but also formats the digital information in view of a schema corresponding to a digital standard. To convert the underlying standard, the system extracts conceptual units (e.g., sentences, phrases, table cell contents, section headings, table headings, etc.) from the underlying standard. The extracted conceptual units are then classified, using a trained machine-learning model, into one of a plurality of classification groups.

Each of the classification groups identifies a function of the conceptual unit within the underlying standard. For example, one classification group may be "requirement". This classification group would include those conceptual units that are identified as or act as requirements within the underlying standard. A requirement is something within the underlying standard that users employing the standards must adhere to in order to maintain conformance with the underlying standard. A requirement is contrasted, for example, with a "note" which merely provides additional information regarding a particular section within the underlying standard but does not result in a rule, regulation, or instruction that the user must follow in order to maintain compliance with the underlying standard.

When extracting the conceptual units and classifying the extracted conceptual units, the system, and machine-learning model, is doing so in view of a schema corresponding to a digital standard. The schema identifies the format of the digital standard. In other words, since each underlying standard would have its own corresponding digital standard, the schema provides a mechanism that allows each digital standard to be displayed in a similar fashion to other digital standards, thereby providing a consistent view for a user regardless of the digital standard that is accessed by the user. Thus, not only does the schema identify the format of the digital standard, but it also provides functionality to the digital standard. This schema is utilized when displaying the digital standard and is what makes the digital standard function as a digital standard and not simply as an electronic version of the underlying standard, as found in conventional techniques. The extracted and classified conceptual units are then stored, based upon the schema, in a data repository that can be accessed by a user interface when a particular digital standard is requested by a user.

When the digital standards are generated, the paper and/or pdf standards are converted to an electronic format and then analyzed and processed to convert the information included within the standard to a format that is easily understood by a user interacting with the system, while maintaining the integrity of the standard. In other words, the system does not paraphrase or alter the text of the paper and/or pdf standard in any way. Rather, utilizing the schema of the digital standards, the system is able to display the standard in a way that is intuitive to a user and that allows for quickly locating information of interest to the user and that is consistent across all the digital standards regardless of the type of standard, entity creating the standard, or the like. Since the schema provides functionality to the digital standard, the system also allows for interacting with the digital standard so that the user can locate target information. For example, the user can provide search terms and filters for locating parts, materials, regulations, or the like, within the standard. The display will then return the results and, based upon a user selecting one of the results, the system will provide additional information that is taken from the standard corresponding to the selected result.

For ease of readability, a few terms will be defined for consistency. However, it should be understood that these definitions are not intended to limit the scope of the described system and method.

The term "digital standard" will refer to the data structure and data models by which information from a given standard is structured and the information that is provided when a user selects content within the data stores or related data stores for viewing. This includes all the information that corresponds to the selected object, for example, across all windows and tabs that are associated with a standard in a user interface.

The term "underlying standard" will refer to the paper or electronic version of the standard. In other words, the term underlying standard refers to the standard that is issued by the governing body associated with the standard document. The term underlying standard also includes revisions to the standard.

The term "governing body" will refer to the entity that issues the underlying standard. This can be a governing body of an entire industry, for example, the transportation, energy, engineering, or the like, industry. Governing body may also refer to an internal governing body, for example, a group or individual within a company that creates and/or issues standards to be utilized within the company or other entity.

The term "aspect" will refer to a section or portion of the digital standard, with each section or portion providing information corresponding to the aspect. Within the user interface, the digital standard may be presented in multiple tabs with each corresponding to a different aspect of the digital standard. Example aspects include composition, properties, sections, requirements, revision history, and the like.

The term "object" will refer to a thing that a user is attempting to locate information for. An object may be any material, part, regulation, standard, specification, or the like, that has a corresponding digital standard. Thus, the term "object" may not only refer to physical things but may also refer to groups of words or digital things, for example, regulations, standards, or data. The term "object" may also refer to a thing made up of other objects. For example, the term "object" refers to both a single bolt and an entire automobile.

An "attribute" refers to a property of an object. The object property may be a physical property, for example, size, pitch, material, or the like. The object property may also be an inherent property, for example, sheer force value, heat resistance value, water resistance value, impact rating, load rating, or the like. The object property may also be a manufacturing property, for example, manufacturing technique (e.g., naturally aged, heat treated, etc.), plating types, or the like. The object property may also be a performance property, for example, typical application, typical cycle time, number of cycles per minute, fluid displacement amount, or the like. Essentially the object property may be any property that is used to identify, utilize, manufacture, or distinguish the object.

A "category type" or "standards category" refers to an overarching category of objects or standards types. For example, an object may be a particular bolt, and the category type may be Parts. As another example, an object may be Non-Ferrous Alloys, and the category type may be Materials Standards or Metals.

A "user" refers to a person or entity interfacing with the user interface and digital standard. The term "user" does not necessarily refer to a specific person and may refer to an entire entity and those people within the entity that can access the user interface. For example, a manufacturer of an object is an entity and will be referred to as a user. However, it should be understood that different people within the entity can access and utilize the described system and method.

The described system provides a system for generating a digital standard from an underlying standard using a machine-learning model. As noted above, the term "machine-learning model" will be used in the singular for ease of readability, but is not intended to limit the scope of the described system to solely a single machine-learning model. The machine-learning model has at least two phases, a training phase and a deployment phase. Many of the steps are similar between the training phase and the deployment phase. However, the information provided to the machine-learning model may differ between the two phases. FIG. 1 is based upon the machine-learning model being in a deployment phase, and, therefore, assumes that the machine-learning model is already trained. The training phase will be discussed in more detail below, in connection with step 103. However, it should be understood that some, if not all, of the steps of FIG. 1 are also applicable during the training phase and will be referred to again when describing the training phase.

Referring now to FIG. 1, the system receives an underlying standard at 101. The received underlying standard does not have to be the entirety of an underlying standard, nor does the system have to utilize every section of the underlying standard in the generation of the digital standard. The underlying standard may include structured and/or unstructured information. Whether the information is structured or unstructured may be based upon the type of standard. For example, a materials standard may contain more unstructured information, whereas a parts standard may contain more structured information. Additionally, whether the information is structured or unstructured may be based upon the entity that publishes the standard. For example, one entity may prefer to provide information in tables as opposed to free-form sections.

The received underlying standard may be in different formats depending on the setup of the system. For example, the received underlying standard may be already converted from a paper standard into a particular electronic format, for example, a .PDF format. As another example, the received underlying standard may be provided in an .XML, format. The XML, document may be a file that was extracted from a PDF format in order to be accessed by the system. Different system setups may require the underlying standard to be provided in different formats and may, therefore, provide functionality for converting the underlying standard into the desired format if the underlying standard is not provided in that format.

Receipt of the underlying standard may include a user uploading the underlying standard to the system or may include the user providing a pointer or link to a location where the underlying standard is located, for example, on the Internet, within a data storage location, or the like. Additionally, or alternatively, receipt of the underlying standard may include the system accessing a known data storage location and retrieving the underlying standard. For example, all underlying standards for processing by the system may be stored in a predetermined data storage location. The system can access this data storage location and retrieve the underlying standard. In other words, receipt of the underlying standard may be performed utilizing any technique for receiving, accessing, or otherwise obtaining the underlying standard.

At 102, the system extracts conceptual units from the underlying standard. Depending on whether the information is structured or unstructured may dictate what constitutes a conceptual unit for a particular standard or portion of a standard. For example, in an unstructured free-form word section, a conceptual unit may be a phrase, sentence, paragraph, section heading, or the like. As another example, in a structured table section, a conceptual unit may be a table component, for example, table cell contents, a table heading, a column header, table note, or the like. Thus, a conceptual unit may be any unit of information contained within the underlying standard that provides some type of information that can be placed within the schema of the digital standard. For example, conceptual units may include not only those identified above, but also graphs, legends, images, image captions, or the like. In other words, a conceptual unit can be any unit of information that can be classified into a classification group corresponding to a schema or structure of the digital standard, as discussed in more detail below.

In extracting the conceptual unit and contextual information, the system may utilize different extraction techniques. For example, the system may utilize part-of-speech and dependency parsing techniques to associate each word within a conceptual unit with a corresponding part-of-speech tag and role tag within the sentence. As another example, the system may utilize term frequency-inverse document frequency (TF-IDF) vectorization that ranks words by importance considering both the frequency of appearance in a single sentence and the infrequency of appearance across all sentences within the dataset. As another example, the system may utilize meta-feature generation which involves computation of the TF-IDF vectors for the hierarchical document sections. As a final example, the system may utilize contextual feature generation which involves including features obtained from preceding and/or trailing sentences surrounding the target conceptual unit. The contextual feature generation may be performed using any of the preceding example techniques. These techniques are merely examples and are not intended to be limiting.

At 103 the system determines if the extracted conceptual units can be classified into a classification group. The classification is performed using at least one trained machine-learning model. The classification groups may be defined based upon the type of underlying standard that is being classified, the entity that generated the underlying standard, the industry utilizing the underlying standard, or the like. For purposes of illustration, the disclosure will use the example of materials and parts standards, where the classification groups include "requirements", "notes", and "recommendations." However, these are merely illustrative and different classification groups, numbers of classification groups, and the like may be utilized.

Each of the classification groups identifies a function of the conceptual unit within the underlying standard. For example, if the conceptual unit is something that a user of the standard must adhere to, the conceptual unit is considered a requirement. In other words, the conceptual unit has the function of a requirement within the underlying standard. Each of the classification groups may include sub-types or sub-groups. For example, the "requirement" classification group may include the sub-types of "conditional requirements", "conditional requirements with reference", "requirements with reference", and the like.

Classification of the extracted conceptual units may be based upon a context of the conceptual unit. In other words, the trained machine-learning model may take into account information surrounding the extracted conceptual unit. As an example, if a conceptual unit is included within a section that contains the word "conditions", the conceptual unit may be classified as a "requirement" even if the conceptual unit itself does not include any indicators that it should be classified as a requirement. This is one advantage to the machine-learning model over a rule-based classification system, where in the rule-based classification system this conceptual unit would be incorrectly classified as something other than a "requirement". Accordingly, the classification is not based solely on the conceptual unit itself, but is also based upon the contextual information surrounding the conceptual unit. The contextual information may include semantic information, syntactical information, section headings, conceptual units occurring before and/or after the target conceptual unit, references, the position of a conceptual unit within the document or a section, and the like.

The classification may also utilize expression patterns for identifying attributes of conceptual units. The classification may also utilize aliasing in identifying similar conceptual units. Additional details regarding use of contextual information, aliasing, expressions, and the like, for classification are provided below in the discussion discussing training the machine-learning model.

The classification of the extracted conceptual units may be done in view of or with respect to a schema of the digital standard that corresponds to the underlying standard. In other words, the purpose of classifying the extracted conceptual units is to generate the digital standard from the extracted and classified conceptual units. Therefore, in order to generate consistent digital standards for multiple underlying standards, a schema may be defined for the digital standard. The schema identifies the format and functionality of the digital standard. Thus, the schema identifies different sections that are included in the digital standard.

Accordingly, when the trained machine-learning model is classifying the extracted conceptual units, the model is classifying them in view of the schema so that the classified conceptual unit can be provided in the proper section of the digital standard. For example, the schema may define a "requirements" section. Thus, the trained machine-learning model may classify the appropriate conceptual units as "requirements" and may tag, label, or format them based upon the requirements section defined within the schema. Accordingly, classifying the extracted conceptual units may also include labeling the extracted conceptual units with the classification group and/or the sub-type classification group. The classification may also include labeling the extracted conceptual units with other information so that it can be properly placed within or formatted in view of the schema of the digital standard. For example, the conceptual unit may be labeled or tagged with an identifier that indicates a section or location within the underlying standard that the conceptual unit was taken from.

As stated above, in classifying and/or labelling the conceptual units, the system utilizes a trained machine-learning model. One example machine-learning model that may be utilized is a logistic regression model which calculates the probability that a conceptual unit belongs to a particular class and selects a classification group with the maximum probability. Another example machine-learning model that may be utilized is a support vector machine model that calculates a linear hyperplane that separates two classification groups based on their numerical feature and classifies a conceptual unit according to the side its vector is on relative to the hyperplane. Another example machine-learning model that may be utilized is a random forest model that builds a collection of shallow decision trees based on a partial, or complete, set of all input features, and classify each conceptual unit according to a majority voting of classification made by all the trees. These are merely illustrative models and are not intended to limit the scope of this disclosure.

Training the machine-learning model may include one or more of a variety of techniques. The technique used to train the machine-learning model may be based upon the type of information (i.e., structured, unstructured, etc.) that the machine-learning model will be classifying. For example, structured information classification may be based upon an annotated standard training technique. As another example, unstructured information classification may be based upon a pattern recognition training technique. Training the machine-learning model is not only based upon training the model with respect to a target piece of information or conceptual unit, but also is based upon training the machine-learning model to learn about information surrounding the target conceptual unit that may assist in the classification. In other words, the machine-learning model is also trained to recognize contextual information that may be useful in accurately classifying the target conceptual unit. For example, the contextual information may provide syntactical or semantical meaning to the target conceptual unit.

To assist in understanding and provide some illustration, some training techniques will be described in detail herein. However, it should be understood that these are simply some example training techniques and are not intended to limit the scope of this disclosure to only these described examples. Many different training techniques may be employed in training the machine-learning model. One example training technique is through the use of an annotated training dataset. In this training technique the machine-learning model is provided with underlying standards, for example, in a manner as described in connection with step 101. However, unlike in the deployment phase, the underlying standards provided in the training phase are annotated or labeled. This is in contrast to the deployment phase where the underlying standards are not annotated or labeled.

Annotated or labeled underlying standards are standards where conceptual units have been labeled with a classification group. This annotation or labeling is generally done by a human or group of humans, at least during the initial training phase. Once the machine-learning model has been deployed and is performing classifications, the machine-learning model may be refined using underlying standards that the machine-learning model itself has annotated. Generally in the refinement phase a human has reviewed the annotations made by the machine-learning model and adjusted any incorrect or inaccurate annotations before the underlying standard is provided back to the machine-learning model for refinement. However, this quality review is not strictly required by the machine-learning model. The refinement phase allows for the machine-learning model to learn more information and become more accurate over time.

Using the annotated underlying standards, the system extracts conceptual units from the annotated underlying standards, for example, similar to step 102. Once the conceptual units are extracted, the machine-learning model accesses the annotation or label that is associated with that extracted conceptual unit. This allows the machine-learning model to learn what conceptual units would fall within a particular classification group. In other words, the machine-learning model learns what causes a particular conceptual unit to be classified into a particular classification group. For example, the machine-learning model may learn that particular section headings cause conceptual units contained within that section to be classified into a particular classification group. As another example, the machine-learning model may learn that particular words contained within a conceptual unit indicate that the conceptual unit should be classified into a particular classification group. Thus, the machine-learning model not only learns what information contained within the conceptual units itself results in a particular classification, but also learns what information surrounding a conceptual unit may lead to a particular classification.

Another example training technique is utilizing patterns to train the machine-learning model. In this training technique, the machine-learning model does not necessarily need to be provided with annotated underlying standards, although annotated underlying standards may assist in training the machine-learning model with patterns. In a pattern-based training technique, the machine-learning model is provided with patterns that have an identified classification. For example, a pattern-based training technique may be useful in classifying table components. Using the example of classifying table components, the machine-learning model is trained to extract the different table components including the table title, column headers, row labels, and the like. The machine-learning model is then trained to recognize different patterns within the table. For example, the machine-learning model is trained to recognize that all table components included within a particular column retain or are associated with the information contained in the column header. Thus, the machine-learning model learns that the table components include information contained in other portions of the table. For example, the machine-learning model learns what attributes (e.g., number units, dimension identification, multipliers, etc.) should be associated with table components based upon other components. The table components can then be classified based upon this information.

The machine-learning model may also be trained using regular expression patterns. Regular expression patterns are sequences of characters that define a search pattern. One use of regular expression patterns is to find and replace search strings. This can be utilized by the machine-learning model to identify number values (e.g., ranges, multipliers, etc.). For example, if the machine-learning model identifies that a column header indicates that all number values included in the column are 10×, then the machine-learning model may use the regular expression pattern to replace the values in the columns with the value×10 in order to accurately classify the information. The machine-learning model may also be trained to use aliasing to identify conceptual units having similar attributes. For example, in one section of the underlying standard a value may be identified as having one label. For this example, we are going to use the label "L" for length. In another section of the underlying standard a value may be identified as having a different label, for example, "Length". Using aliasing, the machine-learning model can be trained to learn that the label "L" and the label "Length" are actually the same attribute. This allows the machine-learning model to more accurately classify information.

The advantage to utilizing the trained machine-learning model over traditional rule-based classification techniques is that the machine-learning model is able to learn over time. Additionally, the rule-based classification techniques result in information being misclassified. For example, if a conceptual unit does not include a particular word that is included in the rule, then the conceptual unit will be misclassified. The trained machine-learning model does not have the same drawback. While the trained machine-learning model is more accurate than the rule-based classification technique, it should be understood that the trained machine-learning model can be used in conjunction with the conventional classification techniques. For example, a rule-based classification technique may be used as one technique for assisting in training the machine-learning model, for example, as base training data.

As another example, a rule-based classification technique may be used as a kind of first-pass classification technique for an underlying standard and the trained machine-learning model may then perform subsequent passes on the underlying standard. In the subsequent passes the machine-learning model may not only classify conceptual units that were not classified by the rule-based classification technique, but may also check the classifications made by the rule-based classification technique. In other words, the trained machine-learning model may act as almost a quality reviewer where the conceptual units that are classified using the rule-based classification technique are then classified by the machine-learning model to find any inaccuracies in the classifications made by the rule-based classification technique.

If the extracted conceptual unit cannot be classified into one of the classification groups at 103, the system may classify the conceptual unit into a default classification group, ignore the conceptual unit, or tag the conceptual unit and notify a user that the conceptual unit was not classified at 105. Once the extracted conceptual units are classified at either 103 or 105, the system stores the classified extracted conceptual units in a data repository at 104. Storing of the classified extracted conceptual units is based upon the schema of the digital standard. In other words, the conceptual units are stored in a manner or format so that they can be accessed by a user interface that is displaying the digital standard. Thus, when storing the classified conceptual units, the system stores the units in a manner defined by the schema so that an API or other access technique can be used to access and retrieve the conceptual unit so that it can be displayed according to the schema.

Thus, once the classified extracted conceptual units are stored in the data repository based upon the schema, a user interface for displaying the digital standard can access the conceptual units to display the digital standard in the user interface in a format in accordance with the schema. Accessing the conceptual units from the data repository may be performed utilizing any technique for doing so. For example, user interfaces and other applications may access information in a data repository utilizing an API (Application Programming Interface). The API defines the types of calls or requests that can be made to the data repository, the format of the calls or requests, the conventions to be utilized in making the calls or request, and the like. In other words, the API identifies how information can be retrieved from the data repository and then displayed within the user interface.

Figure 2A:
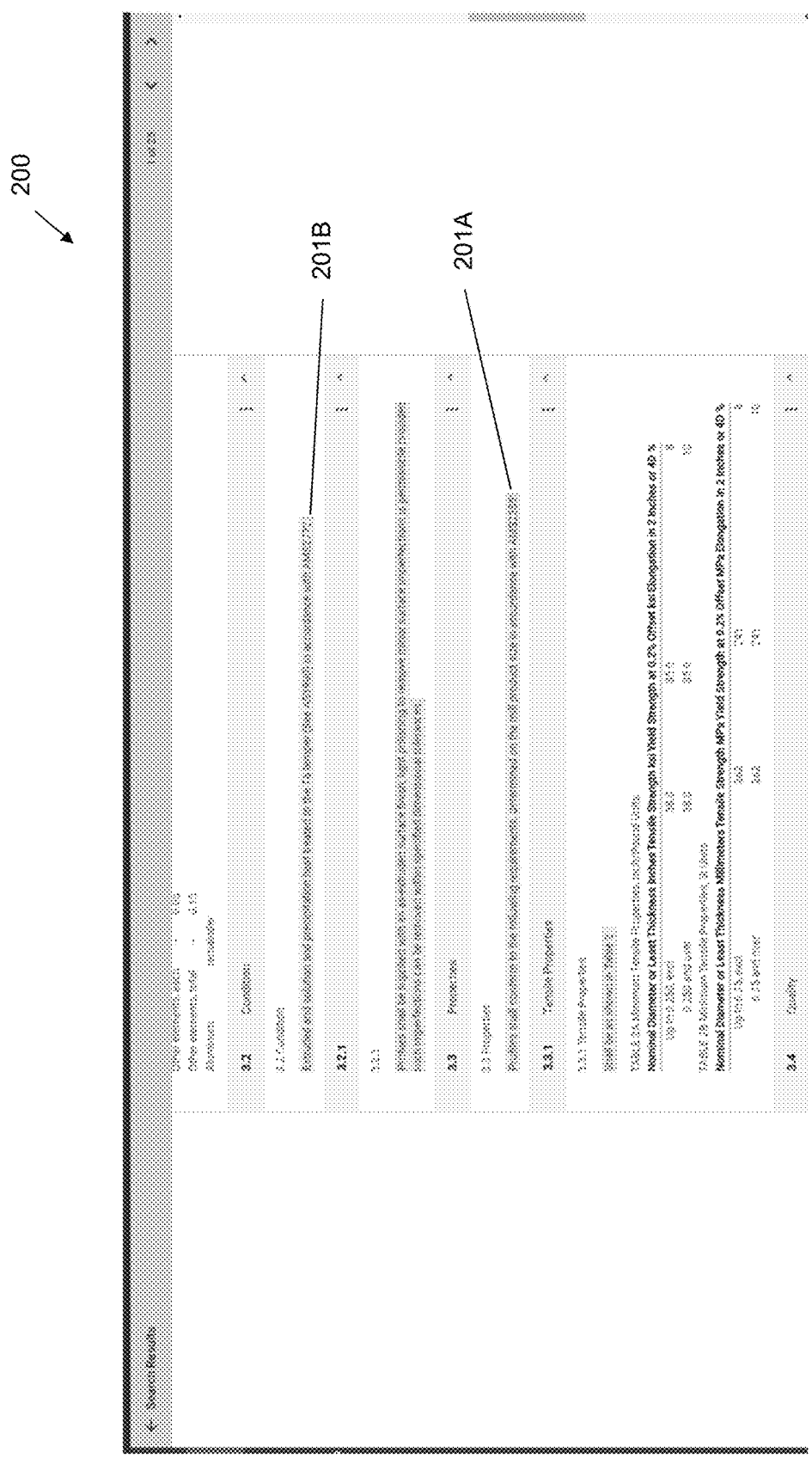
FIG. 2A illustrates an example user interface of a sections tab corresponding to a digital standard of a materials category.
Figure 2B:
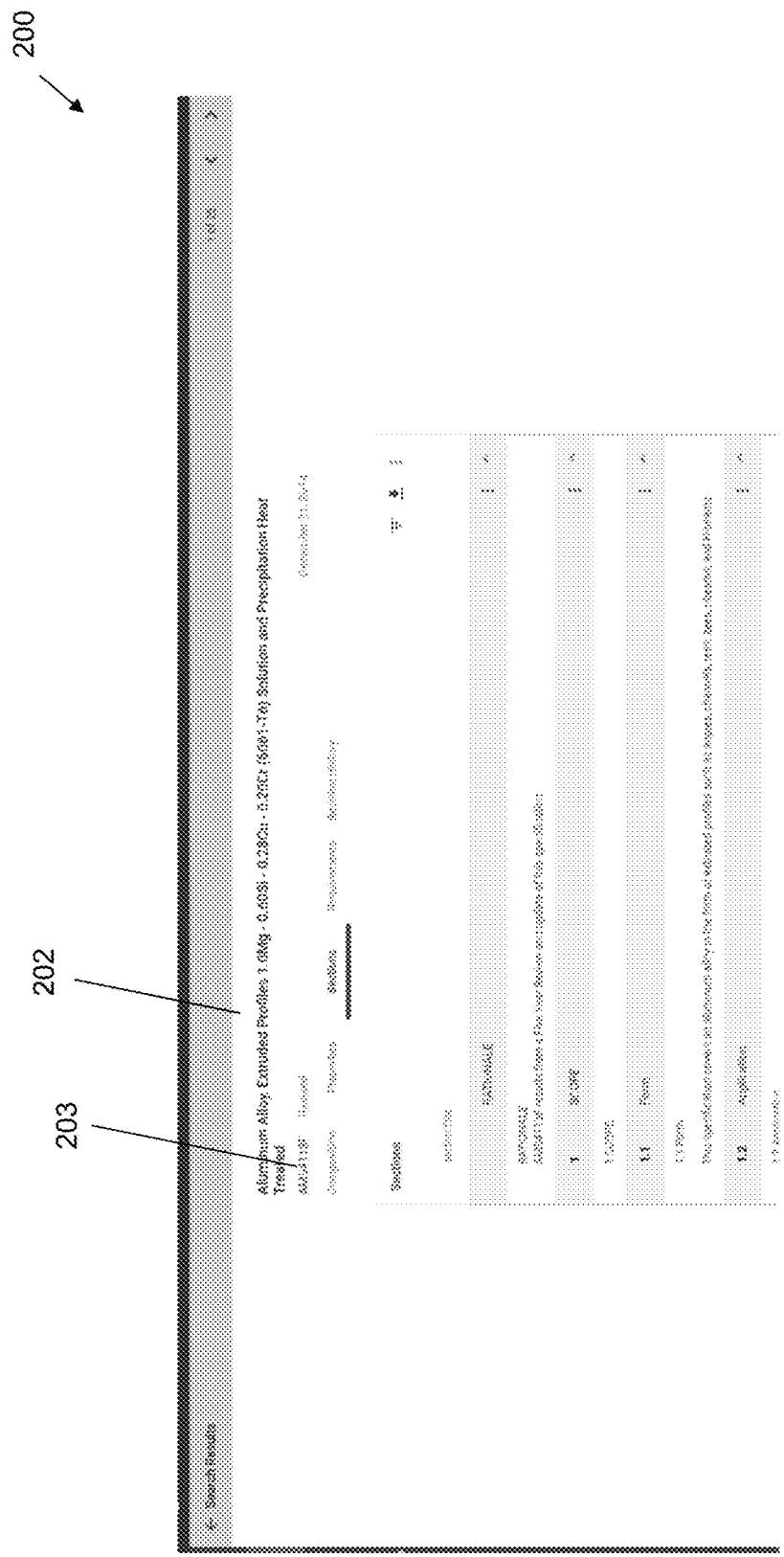
FIG. 2B illustrates an example user interface of a sections tab corresponding to a digital standard of a materials category.

FIGS. 2A and 2B illustrate an example digital standard that is displayed in a user interface 200. FIG. 2A illustrates a scrolled down portion of the user interface that is illustrated in FIG. 2B. The displayed digital standard is used as an example herein to illustrate some of the different information that may be found in an underlying standard and converted to a digital standard. For example, 201A and 201B, illustrated in FIG. 2A, illustrate example "requirements" that were extracted from the underlying standard and classified as a requirement by the trained-machine learning model. The requirement shown at 201A includes the term "shall". In traditional rule-based classification techniques, sentences or phrases like this could be captured. However, the requirement shown at 201B does not include the term "shall," but is still a requirement because it is listed under a section heading "Condition". It is this type of requirement that would not be captured in the rule-based classification techniques, but is captured using the approach described herein. Other example information that may be found in an underlying standard is illustrated in FIG. 2B. For example, 202 illustrates the name and type of the underlying standard. As another example, one conceptual unit that may be extracted is an identifier corresponding to the underlying standard 203. FIG. 2A and FIG. 2B also provide an idea of how the digital standard is displayed, thereby providing an idea of how the classified extracted conceptual units are classified and stored in view of the digital standard schema.

Figure 3:
FIG. 3 illustrates an example user interface of a requirements tab corresponding to a digital standard of a materials category.

FIG. 3 illustrates another example digital standard that is displayed in a user interface. This example illustrates an example requirements tab and so it includes those conceptual units that were classified as requirements 301 by the machine-learning model. Also illustrated in FIG. 3 are examples of the labels 302 that may be assigned to the conceptual unit.

FIG. 4 illustrates another example digital standard that is displayed in a user interface. This example illustrates a table 401 that may be populated from conceptual units extracted from the underlying standard. As illustrated in column 402, the table includes units for the table values. These units may be have been generated by the machine-learning model using aliasing or expression patterns. Thus, the values included in this column are formatted by the machine-learning model in view of the units corresponding to the column.

Once the digital standard is generated, the digital standard may be displayed in a user interface and allow for user interaction with different tabs and/or windows within the digital standard user interface, for example, as illustrated in FIG. 2-FIG. 4. The user interface may be displayed on a display device, for example, a computer monitor, display of a portable information handling device (e.g., laptop computer, tablet, smartphone, cellular phone, personal digital assistant, smart watch, augmented reality display, virtual reality display, etc.), a projector screen, a television display, a smart board, or the like. The user interface may be displayed in response to a user accessing an information handling device where the described system has been installed locally on the device. Additionally, or alternatively, the user interface may be displayed in response to a user accessing a data repository (e.g., cloud computing environment, remote data storage location, network data storage location, a storage location corresponding to a publishing entity, distributed system, etc.) that stores the described system or a portion of the system. For example, a user may access a web application for the user interface, which then communicates with a server of the publishing entity while the database is housed on a wholly separate remote server. As another example, a user may access a data storage repository with user credentials which then displays the user interface.

The system may provide some functionality locally, for example, on the device used and accessed by the user, and may additionally provide some functionality remotely, for example, within a data repository. For example, the system may download some information to be saved locally with respect to the user, for example, user saved searches, user alerts, a skeleton of the user interface, and the like. The system may also access the data repository for other information, for example, the information corresponding to a digital standard. The system may also interact with other relational databases locally or remotely hosted, which may be based upon what the user has access to, as described in more detail herein.

Figure 5:
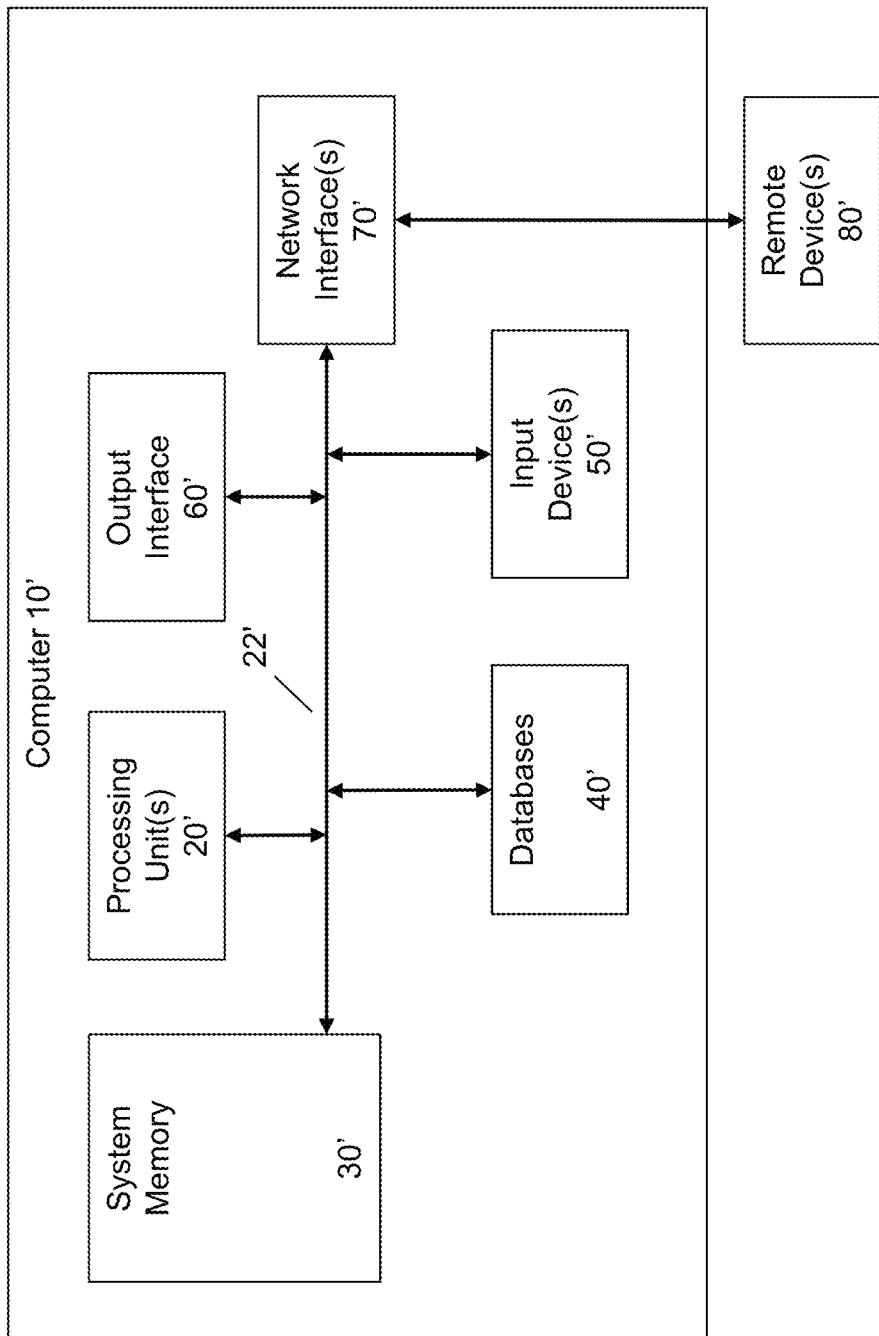
FIG. 5 illustrates an example of device circuitry.

While various other circuits, circuitry or components may be utilized in information handling devices, with a computer, server, client device or the like, an example device that may be used in implementing one or more embodiments includes a computing device in the form of a computer 10' as illustrated in FIG. 5. This example device may be a server used in one of the systems in a network, or one of the remote computers connected to the network. Components of computer 10' may include, but are not limited to, a processing unit 20', a system memory 30', and a system bus 22' that couples various system components including the system memory 30' to the processing unit 20'. Computer 10' may include or have access to a variety of computer readable media, including databases. The system memory 30' may include non-signal computer readable storage media, for example in the form of volatile and/or nonvolatile memory such as read only memory (ROM) and/or random access memory (RAM). By way of example, and not limitation, system memory 30' may also include an operating system, application programs, other program modules, and program data.

A user can interface with (for example, enter commands and information) the computer 10' through input devices 50' (e.g., keyboard, soft keyboard, mouse, auditory inputs, haptic inputs, gesture inputs, etc.). A monitor or other type of device can also be connected to the system bus 22' via an interface, such as an output interface 60'. The computer may include a database 40'. In addition to a monitor, computers may also include other peripheral output devices. The computer 10' may operate in a networked or distributed environment using logical connections to one or more other remote device(s) 80' such as other computers. The logical connections may include network interface(s) 70' to a network, such as a local area network (LAN), a wide area network (WAN), and/or a global computer network, but may also include other networks/buses.

Information handling device circuitry, as for example outlined in FIG. 5, may be used in client devices such as a personal desktop computer, a laptop computer, or smaller devices such as a tablet or a smart phone. In the latter cases, i.e., for a tablet computer and a smart phone, the circuitry outlined in FIG. 5 may be adapted to a system on chip type circuitry. The device, irrespective of the circuitry provided, may provide and receive data to/from another device, e.g., a server or system that coordinates with various other systems. As will be appreciated by one having ordinary skill in the art, other circuitry or additional circuitry from that outlined in the example of FIG. 5 may be employed in various electronic devices that are used in whole or in part to implement the systems, methods and products of the various embodiments described herein.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method for generating a digital standard utilizing a trained machine-learning model, the method comprising:
receiving an underlying standard identifying requirements and data of an object or service and being issued by a governing body associated with the underlying standard;
extracting conceptual units from the underlying standard, wherein a conceptual unit comprises a unit of information contained within the underlying standard;
classifying, using at least one trained machine-learning model, at least a portion of the extracted conceptual units into one of a plurality of classification groups, wherein each of the classification groups identifies a function of the extracted conceptual units, included within a given classification group, within the underlying standard;
wherein the classifying comprises classifying conceptual units from the underlying standard based upon sections of a schema corresponding to a digital standard, wherein the schema identifies a format of the digital standard and provides a functionality to the digital standard; and
storing the classified extracted conceptual units into a data repository based upon the schema.

2. The method of claim 1, comprising displaying a digital standard corresponding to the underlying standard in a digital standard user interface, wherein the displaying comprises accessing the classified extracted conceptual units from the data repository and displaying the classified extracted conceptual units in a user interface format based upon the schema.

3. The method of claim 1, wherein the machine-learning model is trained utilizing annotated underlying standards.

4. The method of claim 1, comprising labeling, using the at least one trained machine-learning model, the extracted conceptual units with a sub-type of the function corresponding to a given extracted conceptual units.

5. The method of claim 1, wherein the conceptual units comprise at least one of sentences and table components.

6. The method of claim 1, wherein the classifying is based upon a context of a given extracted conceptual unit within the underlying standard.

7. The method of claim 1, wherein the classifying comprises identifying, utilizing expression patterns, attributes of extracted conceptual unit.

8. The method of claim 1, wherein the machine-learning model is trained utilizing patterns.

9. The method of claim 1, wherein the classifying comprises identifying, utilizing aliasing, extracted conceptual units representing information having similar attributes.

10. The method of claim 1, comprising refining the at least one trained machine-learning model utilizing subsequently classified extracted conceptual units.

11. A system for generating a digital standard utilizing a trained machine-learning model, the system comprising:
one or more processors;
a memory device that stores instructions executable by the processor to:
receive an underlying standard identifying requirements and data of an object or service and being issued by a governing body associated with the underlying standard;
extract conceptual units from the underlying standard, wherein a conceptual unit comprises a unit of information contained within the underlying standard;
classify, using at least one trained machine-learning model, at least a portion of the extracted conceptual units into one of a plurality of classification groups, wherein each of the classification groups identifies a function of the extracted conceptual units, included within a given classification group, within the underlying standard;
wherein the classifying comprises classifying conceptual units from the underlying standard based upon sections of a schema corresponding to a digital standard, wherein the schema identifies a format of the digital standard and provides a functionality to the digital standard; and
store the classified extracted conceptual units into a data repository based upon the schema.

12. The system of claim 11, comprising displaying a digital standard corresponding to the underlying standard in a digital standard user interface, wherein the displaying comprises accessing the classified extracted conceptual units from the data repository and displaying the classified extracted conceptual units in a user interface format based upon the schema.

13. The system of claim 11, wherein the machine-learning model is trained utilizing annotated underlying standards.

14. The system of claim 11, comprising labeling, using the at least one trained machine-learning model, the extracted conceptual units with a sub-type of the function corresponding to a given extracted conceptual units.

15. The system of claim 11, wherein the conceptual units comprise at least one of sentences and table components.

16. The system of claim 11, wherein the classifying is based upon a context of a given extracted conceptual unit within the underlying standard.

17. The system of claim 11, wherein the classifying comprises identifying, utilizing expression patterns, attributes of extracted conceptual unit.

18. The system of claim 11, wherein the machine-learning model is trained utilizing patterns.

19. The system of claim 11, wherein the classifying comprises identifying, utilizing aliasing, extracted conceptual units representing information having similar attributes.

20. A product for generating a digital standard utilizing a trained machine-learning model, the product comprising:
a storage device that stores code, the code being executable by one or more processors and comprising:
code that receives an underlying standard identifying requirements and data of an object or service and being issued by a governing body associated with the underlying standard;
code that extracts conceptual units from the underlying standard, wherein a conceptual unit comprises a unit of information contained within the underlying standard;
code that classifies, using at least one trained machine-learning model, at least a portion of the extracted conceptual units into one of a plurality of classification groups, wherein each of the classification groups identifies a function of the extracted conceptual units, included within a given classification group, within the underlying standard;
wherein the classifying comprises classifying conceptual units from the underlying standard based upon sections of a schema corresponding to a digital standard, wherein the schema identifies a format of the digital standard and provides a functionality to the digital standard; and code that stores the classified extracted conceptual units into a data repository based upon the schema.

* * * * *